United States Patent Office 3,595,834
Patented July 27, 1971

3,595,834
POLYSULFONAMIDES FROM DIPIPERIDYLS
Daniel Ashton Dimmig, King of Prussia, Pa., assignor to Pennwalt Corporation, Philadelphia, Pa.
No Drawing. Filed Feb. 16, 1970, Ser. No. 11,893
Int. Cl. C08g 20/36
U.S. Cl. 260—49
4 Claims

ABSTRACT OF THE DISCLOSURE

High molecular weight, substantially amorphous polysulfonamides useful for forming fibers and films are the condensation products of an aromatic disulfonyl chloride and a dipiperidyl compound represented by

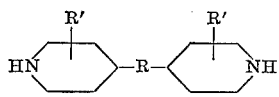

where R is lower alkylene and R' is hydrogen or lower alkyl.

---

This invention relates to a new class of polysulfonamides and more particularly concerns polysulfonamides which are the condensation reaction products of an aromatic disulfonyl chloride and a dipiperidyl compound.

It is known to prepare polysulfonamides useful for forming fibers and films by reacting an aromatic disulfonyl chloride and an aliphatic primary diamine such as hexamethylene diamine. These polymers are not satisfactory for some uses because of their tendency to crystallize and change in dimension on heat ageing. It is also known that the reaction of an aromatic disulfonyl chloride with a heterocyclic secondary diamine, e.g., piperazine, will yield polysulfonamide products. However, these polymers have an undesirably low molecular weight coupled with a high softening temperature, in the range of 250–280° C., making fabrication almost impossible (R. C. Evers and G. F. L. Ehlers, J. Polymer Science, A–1, vol. 5, 1967, p. 1797).

It has now been discovered that a polysulfonamide comprising the condensation reaction product of an aromatic disulfonyl chloride and a dipiperidyl compound having the structure

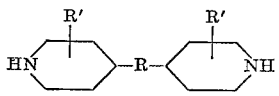

where R is a lower alkylene radical (e.g., having from 1 to about 4 carbon atoms) and R' is hydrogen or lower alkyl, can be synthesized in high yield. These high molecular weight products are substantially amorphous, have excellent clarity, and are easily fabricated into useful shapes.

Representative aromatic disulfonyl chlorides embodied in the polysulfonamides of this invention are m-benzenedisulfonyl chloride; p-benzene disulfonyl chloride; biphenyl - 4,4' - disulfonyl chloride; diphenyl ether-4,4'-disulfonyl chloride, diphenylmethane - 4,4' - disulfonyl chloride; and 1,5-naphthalene disulfonyl chloride. Representative of suitable dipiperidyl reactants are 1,2 - bis(4'-piperidyl)ethane and 1,3-bis(4'-piperidyl)propane.

The polysulfonamides of this invention are conveniently prepared by interfacial polymerization techniques wherein the aromatic disulfonyl chloride in a water immiscible organic solvent is contacted with an aqueous solution of the dipiperidyl compound, said aqueous medium also containing an emulsifying agent and an alkaline neutralizing agent. The emulsifying agent can be chosen from a wide variety of anionic and non-ionic types such as, for example, sodium lauryl sulfate, potassium lauryl sulfate, ethylene oxide condensates with long chain fatty alcohols, long chain fatty acid esters of polyethylene glycol, alkyl naphthalene sulfonates, and many others. The alkaline neutralizing agent is added to neutralize the by-product HCl formed by the condensation reaction between the dichloride and the dipiperidyl compound. An excess of up to about 10% of the alkaline neutralizing agent can be used. Examples of these agents are sodium carbonate, calcium hydroxide, disodium phosphate, sodium hydroxide, potassium hydroxide and trisodium phosphate. Suitable water-immiscible organic solvents for the disulfonyl chloride reactant are benzene, toluene, xylene, methylene chloride and chloroform.

It is preferred to employ sufficient solvent to provide about a 0.1 to 0.3 molar concentration of the aromatic disulfonyl chloride in solution in said water-immiscible solvent. Similarly, it is preferred to use about a 0.1 to about a 0.3 molar concentration of the dipiperidyl compound in the aqueous solution. The amount of emulsifier used is about 1 to 5% of the aqueous phase. Generally, the molar ratio of the dipiperidyl compound to the aromatic disulfonyl dichloride in the reaction mixture will range from about 1:1 to 1.1:1. The polymerization reaction can also be carried out in an essentially anhydrous solvent system if desired.

The temperature employed in the polymerization reaction is in the range of from about 25° C. to 100° C., preferably 30° C. to 60° C. The reaction is normally completed within about 10 to 20 minutes to obtain yields, based on the disulfonyl chloride, of from about 85 to 95%. The polysulfonamide product is recovered by coagulating the polymer by mixing a non-solvent such as methanol with the reaction mixture, followed by filtration and drying. The polymer is a colorless, free-flowing powder.

The polysulfonamides embodied in this invention are substantially amorphous, linear condensation products having recurring units of piperidyl and aromatic sulfonamide linkages such as represented by the polymer obtained by the reaction product of 1,3-bis-(4'-piperidyl)-propane and m-benzenedisulfonyl chloride, having recurring groups as follows:

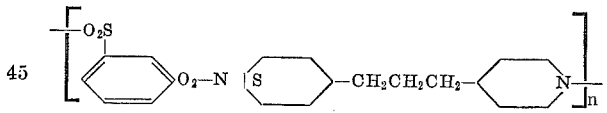

The polysulfonamides embodied herein are soluble in such solvents as dimethylformamide, m-cresol, pyridine, chloroform and sulfuric acid and are insoluble in such solvents as benzene, toluene and methanol. The polymers may be fabricated into useful shapes by conventional drawing techniques from solvent solution or from a polymer melt at temperatures of about 200 to 250° C.

The polysulfonamide products of this invention have a high molecular weight as measured by inherent viscosity defined by the formula $$\eta = \frac{1}{C} \ln \frac{t}{t_0}$$

where $\eta$=inherent viscosity; C=concentration of polymer solution in grams of polymer per 100 ml. of solution at 30° C.; $l_n$=logarithm (natural); $t$=time of flow in seconds of polymer solution; and $t_0$=time of flow in seconds of pure solvent. The inherent viscosities of the polymers range from about 1.2 to 2.0, measured on a solution of 0.5 gram of polymer in 100 ml. of m-cresol at 30° C.

In the following examples, which are set forth to illustrate and clarify the invention, all amounts of ingredients are in parts by weight.

EXAMPLE 1

A reactor equipped with a high speed agitator is charged with 1,000 parts water, 21 parts (0.1 mole) 1,3-bis-(4'-piperidyl)propane, 21.2 parts (0.2 mole) sodium carbonate and 10 parts sodium lauryl sulfate emulsifier. The aqueous solution is stirred and a solution of 27.5 parts (0.1 mole) m-benzenedisulfonyl chloride in 800 parts of methylene chloride is added thereto in five minutes. The temperature of the reaction is about 35° C. The reaction mixture is stirred for an additional fifteen minutes, whereupon the mixture is acidified with dilute aqueous hydrochloric acid solution and poured into 800 parts of methanol with stirring to coagulate the polymer product. The polymer is separated by filtration, washed thoroughly with water and methanol, and dried in a vacuum oven at 120° C. for five hours. The inherent viscosity of the polysulfonamide product is 1.57 (0.5 gram of polymer in 100 ml. of m-cresol at 30° C.) The softening point (stick point) is 160° C. The polymer is melt-pressed at 225° C. to form a clear, transparent film. A colorless transparent film is cast from a 10% solution of the polymer in chloroform.

EXAMPLE 2

The procedure of Example 1 is repeated except that the reactants are 1,3-bis-(4'-piperidyl)propane and diphenyl ether-4,4'-disulfonyl chloride. The polysulfonamide product is a polymer having a softening point of 180° C. and an inherent viscosity of 0.58.

EXAMPLE 3

A reactor equipped with an agitator and condenser is charged with 1100 parts of a 90:10 mixture of tetramethylene sulfone and chloroform, 210.4 parts of 1,3-bis (4-piperidyl)propane, 185.2 parts of calcium hydroxide and 275.1 parts of m-benzenedisulfonyl chloride. The mixture is stirred at reflux temperature for one hour. The product mixture is then cooled and poured into water to precipitate the polymer. The polymer is filtered, washed with 5% aqueous acetic acid, followed by hot water, and dried in a vacuum oven at 80° C. for 16 hours. The inherent viscosity of the polysulfonamide product is 0.77 (0.5 gram of polymer in 100 ml. of concentrated sulfuric acid at 30° C.). The softening point (stick point) is approximately 155° C.

I claim:
1. A high molecular weight film and fiber forming, substantially amorphous polysulfonamide consisting essentially of the condensation reaction product of an aromatic disulfonyl chloride and a dipiperidyl compound having the structure

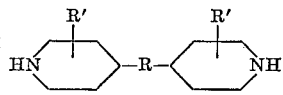

where R is lower alkylene and R' is hydrogen or lower alkyl.

2. The polymer according to claim 1 wherein the aromatic disulfonyl chloride is benzene disulfonyl chloride.

3. The polymer according to claim 2 wherein the dipiperidyl compound is 1,3-bis(4'-piperidyl) propane.

4. The polymer according to claim 1 wherein the aromatic disulfonyl chloride is diphenyl ether-4,4'-disulfonyl chloride.

References Cited
UNITED STATES PATENTS 2,321,890   6/1943   Berchet _____ 260—556
2,808,394   10/1957  Speck _____ 260—79.3

WILLIAM H. SHORT, Primary Examiner

L. L. LEE, Assistant Examiner

U.S. Cl. X.R.

260—30.2, 30.8, 32.6, 33.4, 33.8, 79.3